United States Patent [19]

Renner et al.

[11] Patent Number: 5,020,820
[45] Date of Patent: Jun. 4, 1991

[54] TRACTOR SUSPENSION

[75] Inventors: J. John Renner, Columbus, Nebr.; Steven J. Palmateer, Gardner, Kans.; John S. Petry, Littleton, Colo.; Federick J. Hoppe, Manhattan, Kans.; Steven R. Bertrand, White Oak, Tex.

[73] Assignee: Capacity of Texas, Inc., Longview, Tex.

[21] Appl. No.: 456,553

[22] Filed: Dec. 26, 1989

[51] Int. Cl.$^5$ .................. B62D 53/06; B60G 11/26; B60G 15/07
[52] U.S. Cl. ........................... 280/439; 280/702; 280/711
[58] Field of Search ............ 280/439, 438.1, 702, 280/688, 711, 713, 725, 484, 423.1

[56] References Cited

U.S. PATENT DOCUMENTS

| | | |
|---|---|---|
| 2,536,337 | 1/1951 | Whitlow ................. 280/111 |
| 2,746,766 | 5/1956 | Nallinger ................ 280/725 |
| 2,847,230 | 8/1958 | Hendrickson et al. . |
| 2,968,496 | 1/1961 | Gouirand . |
| 3,081,109 | 3/1963 | Davies et al. . |
| 3,315,980 | 4/1967 | Gorge et al. . |
| 3,494,632 | 2/1970 | Bostrom . |
| 3,732,942 | 5/1973 | Hobbensiefken . |
| 3,746,363 | 7/1973 | Borns .............. 280/713 X |
| 4,029,335 | 6/1977 | Cady et al. ............ 280/439 |
| 4,111,273 | 9/1978 | Blackburn et al. ....... 280/423.1 X |
| 4,379,572 | 4/1983 | Hedenberg ............. 280/711 |
| 4,541,653 | 9/1985 | Raidel ................ 280/702 X |
| 4,566,716 | 1/1986 | Modat . |
| 4,718,692 | 1/1988 | Raidel ................ 280/713 |
| 4,722,549 | 2/1988 | Raidel ................ 280/702 X |
| 4,762,337 | 8/1988 | Raidel ................ 280/688 |

Primary Examiner—Charles A. Marmor
Assistant Examiner—Kevin Hurley
Attorney, Agent, or Firm—Kokjer, Kircher, Bradley, Wharton, Bowman & Johnson

[57] ABSTRACT

A suspension system for improving the ride quality and service life of the tractor used in a tractor-trailer combination. An A-shaped sub-frame is connected at its front apex and with the tractor frame for universal pivotal movement and is rigidly connected at its back end with the rear axle of the tractor. The lift cylinders for the fifth wheel that bears the trailer weight are mounted on the arms of the sub-frame, thus applying the trailer load to the sub-frame rather than to the tractor frame. Suspension elements are interposed between the tractor axle and frame and provide the same cushioning effect regardless of whether the tractor is traveling empty or fully loaded. The universal joint mounting of the sub-frame allows tilting of the rear axle and accommodates other irregularities while avoiding undue stresses on the axle. A transverse link applies side loads from the sub-frame to the frame to avoid undue stressing of the spherical bearing that mounts the sub-frame.

19 Claims, 3 Drawing Sheets

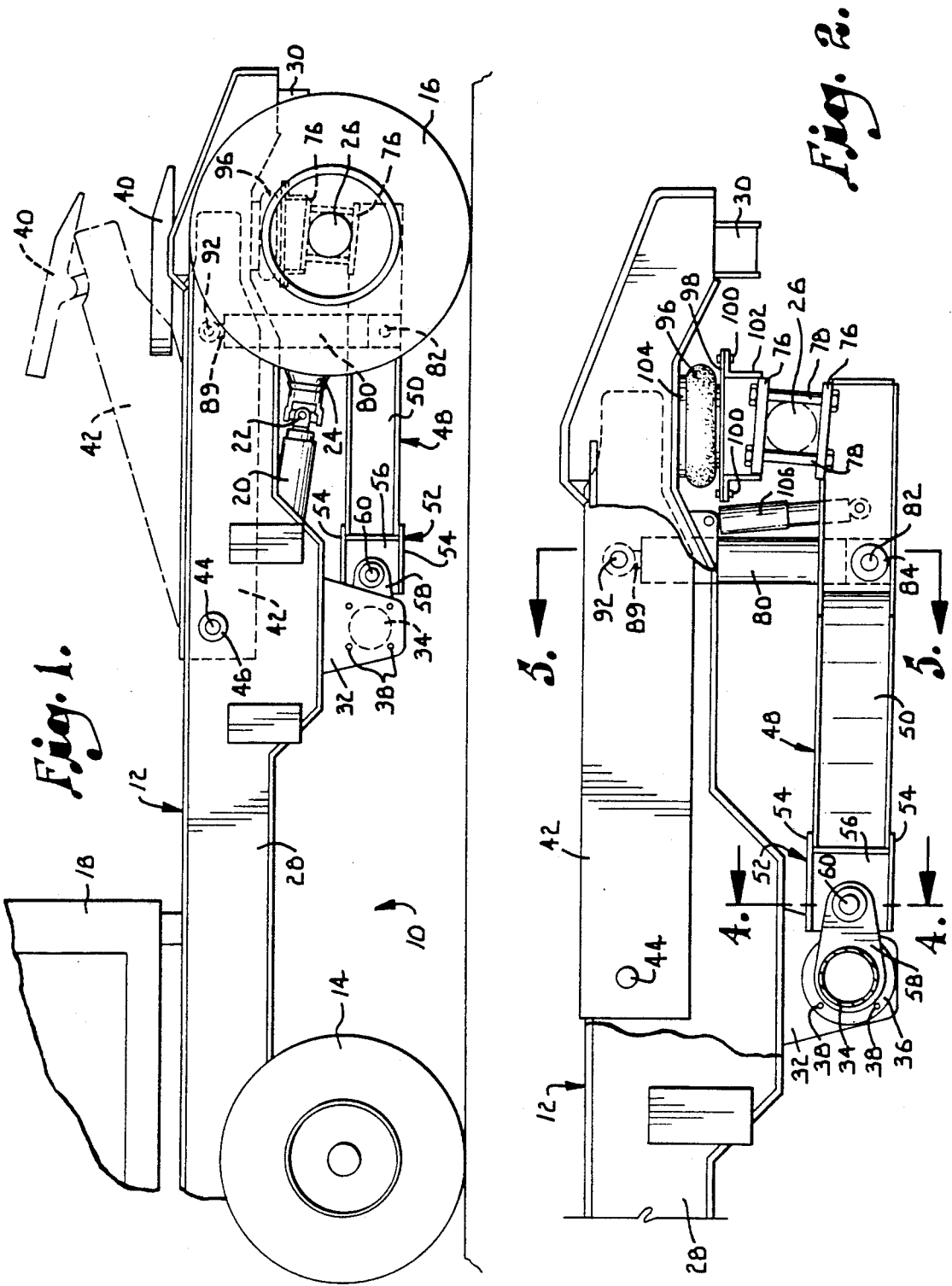

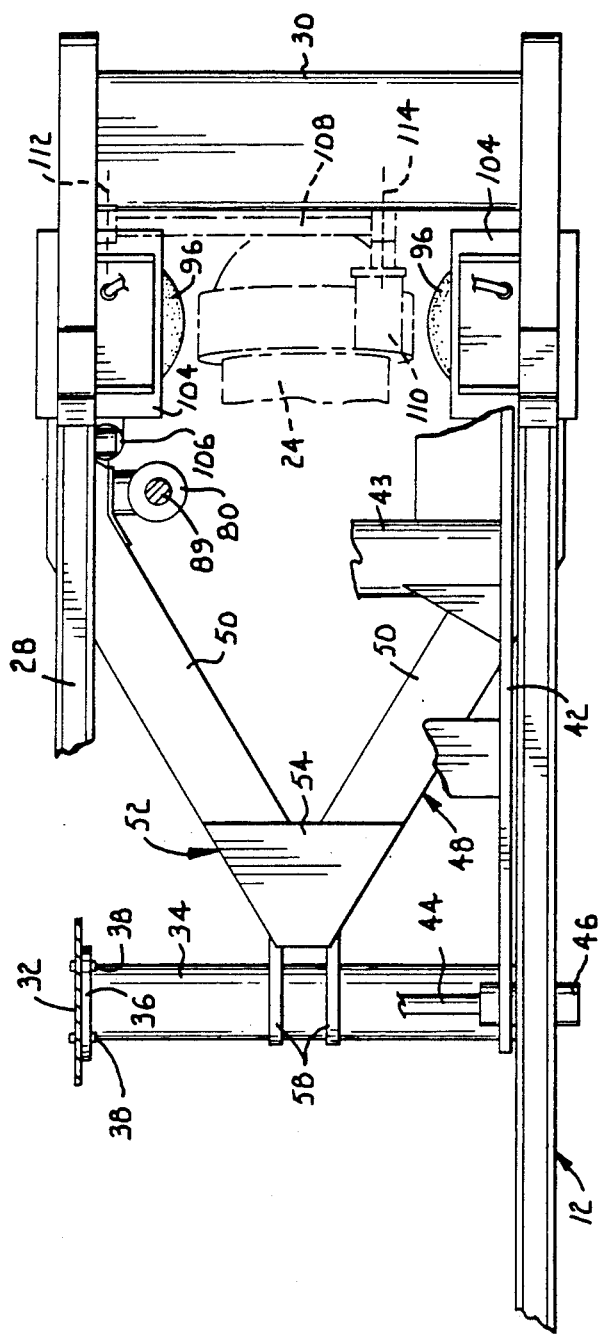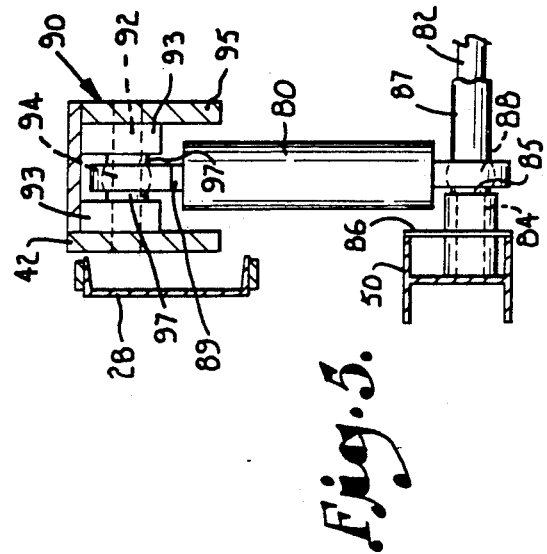

TRACTOR SUSPENSION

BACKGROUND OF THE INVENTION

This invention relates generally to tractor-trailer vehicles and more particularly to a tractor suspension system which improves the ride quality of the tractor both when it is traveling empty and when it is pulling a fully loaded semi-trailer. The suspension system also extends the service life of the vehicle.

Over the road tractor-trailer vehicles have long been used to transport a wide variety of cargos. Typically, the tractor has a fifth wheel on which the front part of the semi-trailer rests. The fifth wheel is usually above the rear axle of the tractor. The load that is borne by the rear axle may be approximately 5,000 pounds when the tractor is traveling by itself. In contrast, when the tractor is pulling a fully loaded semi-trailer, the load on its rear axle may be on the order of about 25,000 pounds.

Due to this great variation in the loading on the rear axle of the tractor, considerable difficulty is presented in providing a suspension system for the tractor which gives reasonable ride quality when the tractor is traveling alone or with an empty semi-trailer while at the same time being able to handle a fully loaded semi-trailer. Presently available mechanical suspension components are unable to operate in a satisfactory manner throughout the wide range of loads that are encountered. Consequently, it is common practice at present to completely omit a suspension system for the tractor and, as can easily be appreciated, this results in a rough ride that can greatly discomfort the driver and other occupants of the vehicle as well as create considerable stresses on the tractor frame.

Attempts have been made to overcome this problem by providing a subframe which is pivoted to the main vehicle frame and which is connected with the axle. The load on the fifth wheel is applied directly to the subframe and through it to the axle. With this type of arrangement, suitable suspension elements can be provided between the axle and the tractor frame to cushion the forces that are transmitted from the axle to the frame. Examples of this type of structure are shown in U.S. Pat. Nos. 4,029,335 to Cady et al; 4,566,716 to Modat; and 3,315,980 to Gorge et al.

The subframes that have been proposed in the past are typically a pair of arms which are pivoted to the frame at one end and connected to the axle at the other end. The simple pivot connections that are provided for the arms allow the axle to move up and down to follow the contour of the roadway. However, if the axle is tilted transversely of the vehicle as occurs when the wheels on one end of the axle drop into a depression in the roadway or move over a raised area, the axle and subframe are subjected to twisting forces that can cause undue stressing of the components and create structural failure. A flexible type connection between the subframe arms and the axle is proposed in the above identified patents, but this complicates the construction of the suspension system and interposes additional springs or other suspension elements in the mounting structure for the fifth wheel.

SUMMARY OF THE INVENTION

The present invention significantly improves the unloaded ride quality of the tractor by providing a structure and a hydraulic lock out system in which the load on the fifth wheel is applied directly to the rear axle of the tractor through hydraulic cylinders instead of to the tractor frame. Lightweight conventional suspension elements located between the axle and frame to cushion the empty tractor are bypassed when the tractor is loaded. Therefore, the suspension system provides a smooth ride for the tractor both when the tractor is pulling a fully loaded semi-trailer and when it is not, since the suspension system only has to handle the load of the tractor frame and this load does not vary significantly regardless of the semi-trailer load. The suspension system isolates the tractor frame from road shock vibration and torsional forces, thereby extending the service life of the vehicle and reducing maintenance which would otherwise be required.

In accordance with the invention, the rear axle of the tractor is mounted rigidly on the back ends of the arms of an A-shaped subframe, and the lift cylinders for the fifth wheel are mounted on the subframe. This arrangement results in the semi-trailer weight being borne almost completely by the rear axle, with the tractor frame receiving only a small part of the semi-trailer load. Pneumatic cushions are interposed between the axle and tractor frame to provide a suspension system that cushions the ride of the tractor. Preferably, shock absorbers are used in conjunction with the air cushions to serve both a dampening function and a protective function to prevent undue "rebound" of the air cushions.

It is a particularly important feature of the invention that the subframe has an A frame configuration and is connected with the tractor frame at its apex in a manner providing it with universal pivoting capability. This feature allows the axle to tilt longitudinally without unduly stressing the axle or any other parts of the suspension or frame. The universal joint connection is preferably effected by a pin on the A frame which is received in a spherical bearing mounted on the tractor frame.

An additional feature of significance is the provision of a transverse link which is pivoted to both the frame and the subframe. The link allows relative movement between the frame and subframe as required to provide a smooth ride for the tractor. At the same time, it transfers side loads to the frame and thus maintains the subframe in proper alignment and keeps it from wandering unduly to either side.

Among the other objects of the invention are to provide a tractor suspension system of the character described which is able to accommodate a wide range of loads in a safe manner, which makes use of readily available components, which is simple and economical to construct, and which functions reliably over an extended operating life.

DESCRIPTION OF THE DRAWINGS

In the accompanying drawings which form a part of the specification and are to be read in conjunction therewith and in which like reference numerals are used to indicate like parts in the various views:

FIG. 1 is a fragmentary side elevational view of a tractor which is equipped with a suspension system constructed according to a preferred embodiment of the present invention, with the fifth wheel of the tractor shown in phantom in its raised position;

FIG. 2 is a fragmentary side elevational view similar to FIG. 1 but on an enlarged scale and with some components removed and portions broken away for purposes of illustration;

FIG. 3 is a fragmentary top plan view of the structure shown in FIG. 2, with portions broken away for purposes of illustration;

FIG. 4 is a fragmentary sectional view on an enlarged scale taken generally along line 4—4 of FIG. 2 in the direction of the arrows; and FIG. 5 is a fragmentary sectional view taken generally along line 5—5 of FIG. 2 in the direction of the arrows.

DETAILED DESCRIPTION OF THE INVENTION

Figure 6:
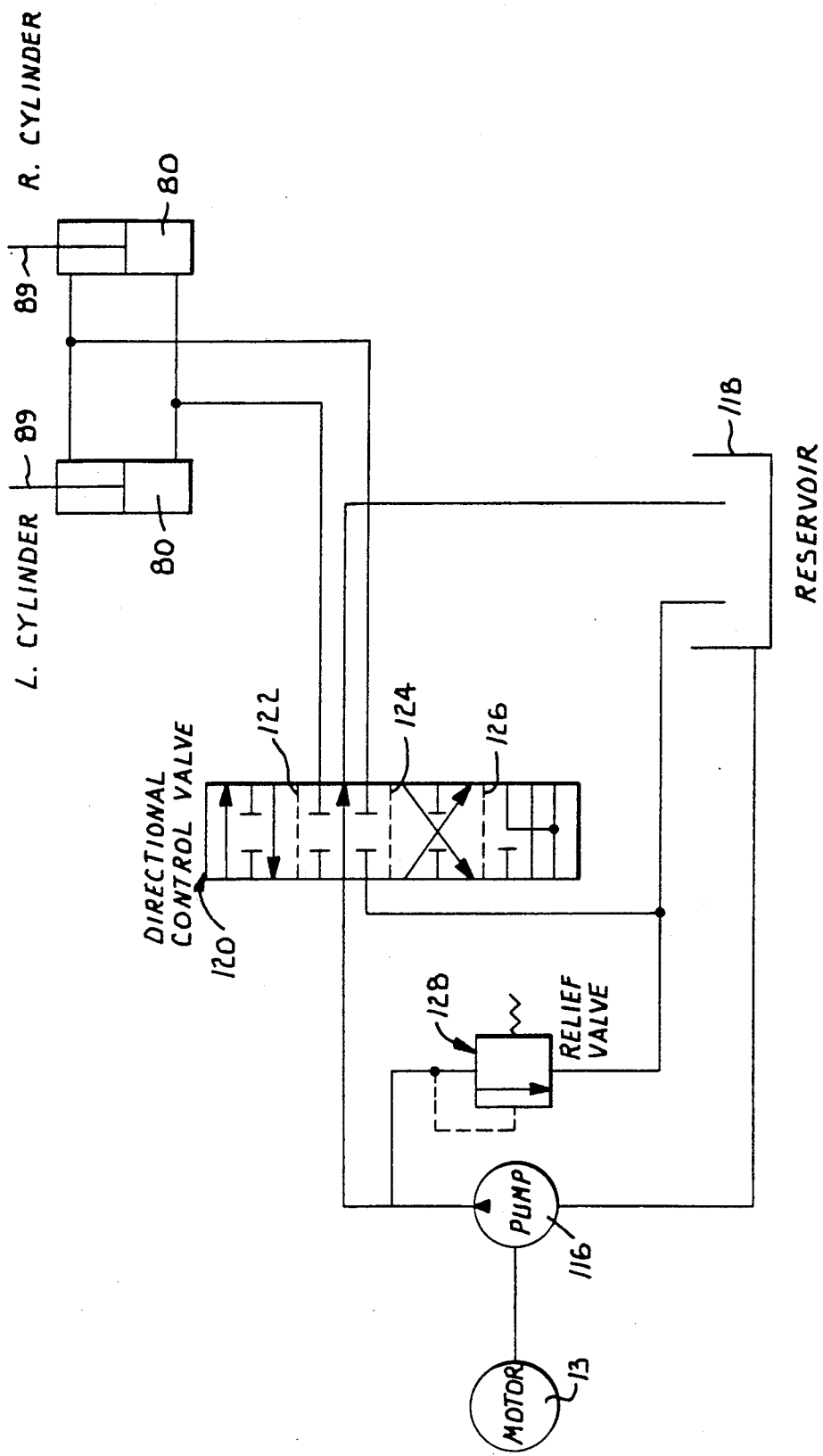
FIG. 6 is a schematic diagram illustrating the hydraulic system for the suspension system.

Referring now to the drawings in more detail and initially to FIGS. 1-3, numeral 10 generally designates a tractor of the type used to pull semi-trailers along highways and other roadways. The tractor 10 has a rigid frame which is generally identified by numeral 12 and which is supported on front wheels 14 and rear wheels 16. A cab 18 is mounted on the front end of the frame 12. The tractor 10 is propelled by a conventional engine 13 (FIG. 6) which turns a drive shaft 20 (FIG. 1). The drive shaft 20 connects through a universal joint 22 with a differential 24. The differential 24 in turn drives a rear axle 26 on which the rear wheels 16 are carried. Typically, each end of the axle 26 is equipped with a pair of the rear wheels 16.

The tractor frame 12 includes a pair of rigid channel beams 28 which are generally parallel to one another on opposite sides of the frame. The beams 28 are connected at their back ends by a rigid cross member 30. Bracket plates 32 extend downwardly from the beams 28, and a transverse tube 34 is connected between the bracket plates 32. Flanges 36 are provided on the opposite ends of tube 34 and are secured to the bracket plates 32 by bolts 38.

The tractor frame 12 is provided with a conventional fifth wheel 40 which supports the front end portion of a semi-trailer (not shown) which the tractor pulls. The fifth wheel 40 is mounted on a rigid pivot frame which includes a pair of parallel arms 42. Extending between the arms 42 is a rigid tube 43 (a fragment of which appears in FIG. 3). The fifth wheel 40 is carried on the back ends of the arms 42, and the front ends of the arms are connected with a transverse shaft 44 which extends horizontally between the beams 28 on the opposite sides of the tractor frame. Shaft 44 is supported by at its opposite ends by sleeve bushings 46 and provides a horizontal pivot axis about which the pivot frame arms 42 can pivot to raise and lower the fifth wheel 40 between the positions shown in broken and solid lines in FIG. 1. The shaft 44 is located directly above tube 34.

In accordance with the present invention, the rear axle 26 is rigidly connected with a subframe which is generally identified by numeral 48. As best shown in FIG. 3, the sub-frame 48 takes the form of an A frame having a pair of rigid arms 50 which may be constructed from I beams. The arms 50 converge from back to front and are connected at their front ends at an apex of the A frame. The connection between the front ends of the arms is formed by a rigid bracket 52 having top and bottom plates 54 and a thicker vertical plate 56 (see FIG. 4 in particular).

The A shaped subframe 48 is connected for universal pivotal movement to the tube 34. A pair of parallel bracket plates 58 are welded to the center portion of tube 34. The back ends of the bracket plates 58 receive and support a horizontal pin 60 in extension between them. One end of the pin 60 is secured to and covered by a cap 62 which is bolted at 64 to one of the bracket plates 58.

The pin 60 extends through a spherical bearing 66 which seats within a ring 68 having a spherical inside surface that mates with the spherical outside surface of the bearing 66. Spacer bushings 70 are located on opposite sides of the bearing 66 to center the A-frame between plates 58, and the entire bearing assembly is contained within a bearing housing 72 which is bolted at 74 to the vertical plate 56 of bracket 52. Bearing 66 allows pin 62 to tilt up and down longitudinally as well as to rock about a vertical axis passing through the center of the pin. Thus, the spherical bearing mounting arrangement permits the A shaped subframe 48 to pivot about three mutually perpendicular axes and thus mounts the A frame in a manner allowing it three degrees of freedom of movement.

The arms 50 diverge from front to back and are rigidly connected with the rear axle 26 at their back ends. As best shown in FIG. 2, the axle 26 is rigidly secured near its opposite ends between a pair of plates 76, and the lower plate 76 in each pair of plates is rigidly secured to the back end of one of the arms 50. Bolts 78 are used to secure the axle 26 between the plates 76.

The arms 42 of the fifth wheel frame are pivoted up and down about the axis of shaft 44 by a pair of hydraulic lift cylinders 80 which are mounted at their lower or base ends to the respective subframe arms 50. As best shown in FIG. 5, a horizontal shaft 82 extends between the subframe arms 50 and is received at its opposite ends in sleeves 84 which are secured to the arms 50. Reinforcing plates 86 are provided on the arms 50 at the locations of the sleeves 84. Each cylinder 80 is provided at its lower end with a spherical bearing 88 which mounts the cylinder on the shaft 82 at a location adjacent to the corresponding arm 50. Bearing 88 is held in position on shaft 82 between a spacer ring 85 adjacent the corresponding sleeve 84, and a spacer tube 87 on the opposite side of the bearing.

The cylinders 80 have extensible and retractable piston rods 89 and connect at their top or rod ends with the opposite sides of the pivot frame for the fifth wheel 40. Each arm 42 of the fifth wheel frame is provided with a bracket 90 (see FIG. 5) which is located immediately behind the transverse tube 43. A horizontal shaft 92 extends between blocks 93 mounted on arm 42 and the side member 95 of each bracket 90. The rod 89 of the corresponding cylinder 80 is connected with the shaft 92 by a spherical bearing 94 which is centered between blocks 93 by spacer rings 97.

In this manner, the hydraulic cylinders 80 connect the fifth wheel frame arms 42 with the A frame arms 50, and the loads that are applied to the fifth wheel 40 are thus transmitted to the cylinders and from the cylinders to the A frame 48. Since the A frame is rigidly connected with the axle 26, the loads on the fifth wheel 40 are transferred to the axle 26 and are not applied in significant part to the tractor frame 12. At the same time, the cylinders 80 can be extended in unison to raise the fifth wheel 40 to the position shown in phantom lines in FIG. 1, and the cylinders can be retracted to lower the fifth wheel to the position shown in solid lines in FIG. 1. The cylinders 80 are displaced only a short distance forwardly from the rear axle 26 and they have nearly vertical orientations.

Because the semi-trailer load is thus applied almost entirely to the axle 26 and not to the tractor frame 12, a suspension system can be provided between the axle 26 and the frame 12 in order to provide a comfortable ride to the tractor 10 and the occupants of the cab 18. The suspension system preferably includes a pair of pneumatic cushions 96. As best shown in FIG. 2, each cushion 96 is mounted on a plate 98 which is in turn bolted at 100 to a mounting bracket 102. The two mounting brackets 102 are secured to the upper plates 76 which are located adjacent to the opposite sides of the frame 12. Another plate 104 overlies each air cushion 96 and is suitably secured to the corresponding beam 28 of the tractor frame.

In addition to the pneumatic cushions 96, a pair of conventional shock absorbers 106 are connected between the tractor frame 12 and the subframe 48. The shock absorbers 106 are pivotally connected at their base ends with the respective subframe arms 50 and at their upper ends with the beams 28 on the opposite sides of the tractor frame 12. The shock absorbers 106 serve both a dampening function and a protective function in that they prevent excessive expansion ("rebound") of the pneumatic cushions 96.

As shown in FIG. 3, a transverse link 108 is connected at one end with one side of the tractor frame 12 and at the opposite end with a bracket 110 which is connected with the rear axle 26 and the subframe 48. The link 108 is able to pivot about the horizontal axes identified by numerals 112 and 114 in FIG. 3, and the link thus permits the subframe to move up and down as required to function as intended. At the same time the link 108 transfers side loads that are applied to the subframe 48 to the frame 12, thus maintaining the subframe 48 in the proper alignment and preventing it from wandering unduly from side to side. The presence of the link 108 prevents side load forces from being borne in significant part by the spherical bearing 66 and thus avoids the application of high stresses to the bearing.

In operation, the suspension system of the present invention provides the tractor 10 with a comfortable ride both when the tractor is traveling with and without a loaded semi-trailer. When the semi-trailer is attached to the fifth wheel 40, its load is applied through the cylinders 80 to the rear axle 26. Consequently, the air cushions 96 provide substantially the same cushioning effect for the tractor frame 12 when the semi-trailer is attached and when it is not attached, since the load that is applied to the frame 12 does not differ appreciably in the two situations.

The A frame configuration of the subframe 48 provides it with sufficient strength to withstand the loads to which it is subjected in service. In addition, the A frame configuration provides the subframe with an apex which can be mounted at a single location for universal pivotal movement of the A frame.

The cylinders 80 are preferably provided with a valving arrangement that allows them to "float". Consequently, when the wheels 16 on one end of the rear axle 26 move through a depression or over a raised area, the rear axle 26 can tilt longitudinally without applying undue stresses to the axle 26 or to the subframe 48. If the back end of one of the arms 50 moves up or down relative to the back end of the other arm 50, the entire subframe 48 is able to tilt by virtue of the universal joint mounting arrangement provided by the spherical bearing 66. Thus, the pin 60 is able to tilt longitudinally as permitted by the bearing. In addition, the back end of the subframe 48 can move up and down to follow the contour of the roadway, and the air cushions 96 and shock absorbers 106 transmit the resulting forces to the frame 12 in a manner providing the occupants of the cab 18 with a smooth and comfortable ride.

The hydraulic system which permits the aforementioned "float" of the cylinders 80 is schematically illustrated in FIG. 6 of the drawing. A hydraulic pump 116 operably coupled with a motor which can be the vehicle engine 13, is operably connected by the hydraulic lines shown between a hydraulic reservoir 118 and the cylinders 80. A valve 120 controls the direction of flow of hydraulic fluid in the lines. Valve 120 is preferably a manually operated, four position valve having internal configurations for effecting the connections illustrated in FIG. 6 with a first position shown above the broken line 122, a second position shown between line 122 and broken line 124, a third position between line 124 and broken line 126 and a fourth position shown below broken line 126. Preferably, valve 120 is spring biased to the second position when it is in either the first or third positions. However, when valve 120 is shifted to the fourth position, it will remain in that position until it is manually shifted to a different position. A pressure relief valve 128 is schematically illustrated interposed in a relief line extending from the pressure line from the pump to the return line from the cylinders to the reservoir.

The operation of the hydraulic system illustrated in FIG. 6 will be readily apparent to those skilled in the art. Valve 120 is shifted to the first position connecting the pump outlet to the lifting side of cylinders 80 to raise the frame upon which fifth wheel 40 is mounted. At the same time, the outlet sides of cylinders 80 are connected through valve 120 to reservoir 118 via the return hydraulic line.

When valve 120 is shifted to the second position, flow of fluid to the cylinders from the pump and from the cylinders to the reservoir is blocked. This holds the cylinders and consequently the fifth wheel in whatever elevated condition may be desired.

It should be pointed out that the ports on the sides of the cylinders for extending the cylinders are hydraulically connected together as are the ports on the sides of the cylinders for retracting the cylinders. This permits one cylinder to automatically retract as the other cylinder extends as might result from the tractor wheels encountering an uneven road surface condition such as a bump or depression. Float as mentioned above is achieved as a result of the two cylinders working together in this manner when the fifth wheel is elevated.

When the cylinders are retracted however, neither cylinder would be free to extend or retract, with the valve in the second position, negating the ability of the axle to pivot with respect to the rigid frame when one side of the truck drives over a depression in the road surface. This is avoided by shifting the valve to the fourth position when driving with the cylinders retracted. The fourth valve position interconnects all of the cylinder ports with the fluid line to the fluid reservoir. This permits a single cylinder, or both if necessary to extend or retract independently of one another. This maintains the float condition, even with the fifth wheel lowered. Thus, the valve is normally shifted to the fourth position when the truck is driven with the cylinders retracted.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. A suspension system for a tractor having a frame, a rear axle carrying wheels and a fifth wheel for supporting a semi-trailer pulled by the tractor, said suspension system comprising:
  a sub-frame including a pair of rigid arms each having opposite end portions, each arm being rigidly connected at one end portion thereof with the rear axle;
  means for coupling the opposite end portion of each arm with the frame for universal pivotal movement relative to the frame;
  means for mounting the fifth wheel on said sub-frame in a manner to transmit loads applied to the fifth wheel to the rear axle; and
  plural suspension elements interposed between the sub-frame and frame to transfer forces applied to the rear axle through said suspension elements to the frame, said sub-frame presenting an A-frame configuration with said arms converging toward said opposite end portions and being jointed at an apex of said A-frame configuration;
  said coupling means comprising means for coupling said apex with the tractor frame for universal pivotal movement relative thereto.

2. The suspension system of claim 1, including a link oriented generally transversely to the tractor frame and having opposite ends pivotally coupled to the tractor frame and sub-frame, respectively, to transmit laterally applied forces therebetween.

3. The suspension system of claim 1, wherein said means for coupling said apex comprises:
  a general horizontal pin on said apex; and
  a spherical bearing mounted on the tractor frame and receiving said pin.

4. The suspension system of claim 1, wherein said suspension elements comprise a pair of pneumatic cushions interposed between the axle and tractor frame.

5. The suspensions system of claim 4, including a pair of shock absorbers connected between the tractor frame and sub-frame.

6. A suspension system for a tractor having a frame, a rear axle carrying wheels and a fifth wheel for supporting a semi-trailer pulled by the tractor, said suspension system comprising:
  a sub-frame including a pair of rigid arms each having opposite end portions, each arm being rigidly connected at one end portion thereof with the rear axle;
  means for coupling the opposite end portion of each arm with the frame for universal pivotal movement relative to the frame;
  means for mounting the fifth wheel on said sub-frame in a manner to transmit loads applied to the fifth wheel to the rear axle; and
  plural suspension elements interposed between the sub-frame and frame to transfer forces applied to the rear axle through said suspension elements to the frame, said means for mounting the fifth wheel comprising a rigid pivot frame on which the fifth wheel is carried, said pivot frame being coupled with the tractor frame for pivotal movement to raise and lower the fifth wheel, and actuating means extending between said pivot frame and said sub-frame for supporting the pivot frame and pivoting same to raise and lower the fifth wheel.

7. The suspension system of claim 6, wherein said actuating means comprises a pair of hydraulic cylinders extending between the pivot frame and the respective arms of the sub-frame, said cylinders being extensible and retractable to raise and lower the fifth wheel and critically located to carry the trailer load directly through the axle to the ground.

8. A tractor for pulling a semi-trailer, comprising:
  a tractor frame;
  a rear axle carrying ground engaging wheels;
  a sub-frame including a pair of rigid arms each having a front end portion and a back end portion;
  means for rigidly connecting said back end portions of said arms with said axle at spaced apart locations thereon to effect transfer of loads applied to the axle to said sub-frame;
  universal joint means for coupling said front end portions of said arms with the tractor frame in a manner permitting universal pivotal movement of each arm relative to the frame, thereby accommodating axial tilting of the rear axle;
  suspension means including plural suspension elements for coupling the rear axle with the tractor frame in a manner to transmit forces from the axle to the frame through said suspension elements;
  a fifth wheel for supporting the semi-trailer;
  a pivot frame carrying said fifth wheel and coupled with said trailer frame for pivotal movement about a substantially horizontal axis to raise and lower the fifth wheel; and
  a pair of extensible and retractable lift cylinders connected between said pivot frame and the respective arms of the sub-frame for raising and lowering the fifth wheel and transferring loads from the fifth wheel through the cylinders and sub-frame to the rear axle.

9. The tractor of claim 8, wherein:
  said sub-frame presents an A-frame configuration with said arms converging toward said opposite end portions and being jointed at an apex of said A-frame configuration; and
  said coupling means comprises means for coupling said apex with the tractor frame for universal pivotal movement relative thereto.

10. The tractor of claim 8, including a link oriented generally transversely to the tractor frame and having opposite ends pivotally coupled to the tractor frame and sub-frame, respectively, to transmit laterally applied forces therebetween.

11. The tractor of claim 9, wherein said means for coupling said apex comprises:
  a generally horizontal pin on said apex; and
  a spherical bearing mounted on the tractor frame and receiving said pin.

12. The tractor of claim 8, wherein said suspension elements comprise a pair of pneumatic cushions interposed between the axle and tractor frame.

13. The tractor of claim 12, including a pair of shock absorbers connected between the tractor frame and sub-frame.

14. In a tractor of the type having a tractor frame, a rear axle carrying wheels, a fifth wheel for supporting a semi-trailer pulled by the tractor, and a pivot frame pivoted to the tractor frame and carrying the fifth wheel thereon, the improvement comprising:
- an A-frame structure having a pair of rigid arms converging from back to front and joined at the front at an apex, said arms being connected with said axle at spaced apart locations thereon to transmit forces from the axle to the A-frame structure;
- means for coupling said apex with the tractor frame in a manner permitting universal pivotal movement of the A-frame structure relative to the tractor frame;
- resilient suspension means for coupling axle with the tractor frame in a manner transmitting forces from the axle through said suspension means to the tractor frame; and
- fifth wheel actuating means for connecting said pivot frame with said A-frame structure and for pivoting said pivot frame to raise and lower the fifth wheel, said actuating means receiving loads applied to the fifth wheel and transmitting the loads to the A-frame structure.

15. The suspension system of claim 14, wherein said means for coupling said apex comprises:
- a generally horizontal pin on said apex; and
- a spherical bearing mounted on the tractor frame and receiving said pin.

16. The improvement of claim 14, wherein said resilient suspension means comprises a pair of pneumatic cushions interposed between the axle and tractor frame at spaced apart locations.

17. The improvement of claim 16, including a pair of shock absorbers connected between the tractor frame and said A-frame structure.

18. The improvement of claim 14, wherein said actuating means comprises a pair of hydraulic cylinders extending between the pivot frame and the respective arms of said A-frame structure, said cylinders being extensible and retractable to raise and lower the fifth wheel.

19. The improvement of claim 18, wherein said hydraulic cylinders each have an inlet port for the ingress of fluid to extend the cylinder, and each have an outlet port for the egress of fluid to retract the cylinder, said actuating means including control structure operably coupling the inlet and outlet ports together to permit independent operation of the cylinders under the influence forces imparted to the wheels of said tractor.

* * * * *

UNITED STATES PATENT AND TRADEMARK OFFICE
CERTIFICATE OF CORRECTION

PATENT NO. : 5,020,820
DATED : June 4, 1991
INVENTOR(S) : Renner, Palmateer, Petry, Hoppe and Bertrand It is certified that error appears in the above-identified patent and that said Letters Patent is hereby corrected as shown below:

ON TITLE PAGE: Item [75] the inventors, "J. John Renner" should be changed to -- R. John Renner -- and "Federick J. Hoppe" should be changed to -- Frederick J. Hoppe --.

Signed and Sealed this

Thirteenth Day of October, 1992

*Attest:*

DOUGLAS B. COMER

*Attesting Officer*     *Acting Commissioner of Patents and Trademarks*